(12) United States Patent
Amano et al.

(10) Patent No.: US 6,553,134 B1
(45) Date of Patent: Apr. 22, 2003

(54) IMAGE READING APPARATUS

(75) Inventors: Masashi Amano, Nara (JP); Sadahiko Hinoue, Nara (JP); Masaharu Satoh, Nara (JP); Kouichi Harada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/487,883

(22) Filed: Jan. 20, 2000

(30) Foreign Application Priority Data

Jan. 20, 1999 (JP) .............................. 11-012231

(51) Int. Cl.[7] ................................. G06K 9/00
(52) U.S. Cl. ......................... 382/124; 250/556
(58) Field of Search ...................... 382/124, 127, 382/115–120; 358/474, 475; 250/484.4, 504, 556; 345/87, 88, 102

(56) References Cited

U.S. PATENT DOCUMENTS

| | | | |
|---|---|---|---|
| 5,446,290 A | * 8/1995 | Fujieda et al. | 250/556 |
| 5,619,586 A | * 4/1997 | Sibbald | 382/127 |
| 5,635,723 A | * 6/1997 | Fujieda et al. | 250/556 |
| 5,796,858 A | * 8/1998 | Zhou et al. | 382/127 |
| 6,040,810 A | * 3/2000 | Nishimura | 345/87 |

FOREIGN PATENT DOCUMENTS

| | | |
|---|---|---|
| JP | B22568310 | 10/1996 |
| JP | A9186312 | 7/1997 |

* cited by examiner

*Primary Examiner*—Samir Ahmed
*Assistant Examiner*—Vikkram Bali
(74) *Attorney, Agent, or Firm*—Birch, Stewart, Kolasch & Birch, LLP

(57) ABSTRACT

An object of the invention is to provide a small-size image reading apparatus which has a high accuracy in image reading, by a different means from the prior arts. A panel includes a plurality of two-dimensionally arranged photoreceptor devices which are interposed between a pair of light-transmitting substrates. At an edge of one of the light-transmitting substrate, a slope is formed, and a light source is opposed to the slope. Light transmitted by reflection on the surfaces of the light-transmitting substrates is emitted on an object which comes in contact with the surface of the panel, and light returned from the object is received by the photoreceptor devices, whereby an image of the object is read. Thus, a direction in which light passes through the panel can be restricted, and the accuracy in image reading can be increased.

17 Claims, 7 Drawing Sheets

IMAGE READING APPARATUS

BACKGROUND OF THE INVENTION

1. Field of the Invention

The present invention relates to an image reading apparatus which is capable of reading a fingerprint and the like.

2. Description of the Related Art

As the development of a networked society, the integration of portable equipments and a radio network has been progressed, and the necessity of a security function such as personal identification has also been increased in portable equipments, which need to be downsized. As personal identification, identification by living body information such as a fingerprint has received attention, because a portable equipment which adopts this identification cannot be easily abused by another person, and living body information can never be lost unlike a key and an IC card. As a method of reading a fingerprint, a method using an optical system such as a prism is dominating.

FIGS. 9A, 9B are views showing a fingerprint reading apparatus which uses a prism. In FIG. 9A, among a top face 1a and side faces 1b, 1c of a prism 1, a finger is rested on the top face 1a and irradiated with light via the side face 1b, and light reflected on the top face 1a and coming out through the side face 1c is picked up by a CCD (charge-coupled device) camera 2. In FIG. 9B, the CCD camera 2, which is positioned on the side of a light source, picks up light scattered on the top face 1a and coming out through the side face 1b.

Further, Japanese Unexamined Patent Publication JP-A 9-186312 (1997) discloses a liquid crystal display device in which a photoreceptor device is imbedded. This device has a condenser lens for condensing light onto the photoreceptor device, thereby imaging a face of a person who is away from a display screen.

Since the fingerprint reading apparatus shown by FIGS. 9A, 9B uses a prism, it is impossible to decrease the thickness of the apparatus and difficult to downsize the apparatus, and since the liquid crystal display device disclosed in JP-A 9-186312 has a condenser lens, it is also difficult to downsize the device.

SUMMARY OF THE INVENTION

An object of the invention is to provide a small-size image reading apparatus which shows an excellent accuracy in image reading, by a different means from the prior arts.

The invention provides an image reading apparatus comprising:
  a panel including a pair of light-transmitting substrates and a plurality of photoreceptor devices which are two-dimensionally arranged and interposed between the pair of substrates, an edge of one of the pair of light-transmitting substrates being provided with a slope; and
  a light source opposed to the slope of the light-transmitting substrate,
  wherein an object in contact with a surface of the panel is irradiated with light transmitted within the panel, and the light returned from the object is received by the photoreceptor devices, whereby an image of the object is read.

According to the invention, light from the light source is let in through the slope of the light-transmitting substrate, and the light is transmitted by reflection on the surface of the panel, whereby a direction in which the light is transmitted within the panel can be restricted.

In other words, light from the light source enters through the slope opposed to the light source, so that light from a direction of reaching the slope at a relatively small incident angle enters in the light-transmitting substrate, whereas light from a direction of reaching the slope at a relatively large incident angle is reflected by the slope and does not enter in the light-transmitting substrate. As a result, a direction in which light travels in the panel can be restricted. Moreover, among light beams reaching the surface of the panel, a light beam reaching at an angle equal to or more than a critical angle is totally reflected. On the other hand, as for light beams reaching at an angle less than the critical angle, some of the light beams are reflected and travel in the panel again, whereas the rest go out of the panel. By reflected on the surface of the panel again and again, the light beams travelling in a direction of reaching at an incident angle less than the critical angle are screened out. As a result, a direction in which light travels in the panel can be restricted still more.

Thus, an image of an object in contact with the surface of the panel is read by using light travelling in a restricted specific direction, so that the accuracy in image reading can be increased. Moreover, since a direction in which light travels can be restricted only by forming a slope at an edge of the light-transmitting substrate and opposing a light source to the slope, another optical system such as a condenser or a spectroscope is not needed, and a downsized apparatus can be produced.

Further, the invention provides an image reading apparatus comprising:
  a panel including a pair of light transmitting substrates, a plurality of photoreceptor devices which are two-dimensionally arranged and a liquid crystal layer having a variable transmittance, the plurality of photoreceptor devices and the liquid crystal layer constituting photoreceptive pixels and being interposed between the pair of substrates, an edge of one of the pair of light-transmitting substrates being provided with a slope; and
  a light source for launching light into the panel,
  wherein an object in contact with a surface of the panel is irradiated with light transmitted within the panel, and the light returned from the object is received by the photoreceptor devices, whereby an image of the object is read.

According to the invention, a direction in which light travels within the panel can be restricted in the same manner as mentioned before, so that the accuracy in image reading can be increased. Moreover, the panel is provided with a liquid crystal layer, and thereby a transmittance can be changed for each photoreceptive, so that a direction in which light travels within the panel can be restricted still more, and the accuracy in image reading can be increased. In addition, by controlling a transmittance of the liquid crystal layer for each photoreceptive pixel, it is also possible to use the panel for display.

Still further, the image reading apparatus of the invention further comprises liquid crystal controlling means for carrying out control of allowing light to pass through a portion of the liquid crystal layer, the portion of the liquid crystal layer being located on an optical path extending from the slope of the light-transmitting substrate to a photoreceptor device.

According to the invention, light travelling in a direction restricted in a manner as described before passes through a restricted optical path and reaches a photoreceptor device. Since a portion of the liquid crystal layer which is located on the optical path leading to the photoreceptor device is controlled so that light passes therethrough, light which passes through another path would not be received, the occurrence of noise can be prevented, and the accuracy in image reading can be increased still more.

Still further, the image reading apparatus of the invention further comprises data extracting means for extracting photoreceptive data of a photoreceptor device located on an optical path which extends from the slope of the light-transmitting substrate and passes through a portion of the liquid crystal layer through which light has passed, from among photoreceptive data of all the photoreceptor devices.

According to the invention, light which has passed through a portion of the liquid crystal layer travels through a restricted optical path and reaches a photoreceptor device. In the invention, firstly, photoreceptive data are derived from all the photoreceptor devices including a specific photoreceptor device located on the restricted optical path. Since photoreceptive data of the specific photoreceptor device associated with the portion of the liquid crystal layer through which light has passed is extracted from among all the photoreceptive data, photoreceptive data on light which has passed in another path would not be used, the occurrence of a noise can be prevented, and the accuracy in image reading can be increased still more.

Still further, in the invention it is preferable that the panel is provided with a mask for blocking light which enters via a surface of the light-transmitting substrate and reaches a photoreceptor device.

According to the invention, the panel is provided with a mask for blocking light which enters via the surface of the panel and reaches a photoreceptor device. For example, by forming the mask immediately above a photoreceptor device, light which enters via the surface of the panel can be blocked, the occurrence of noise due to ambient light can be prevented, and the accuracy in image reading can be increased still more.

Still further, the image reading apparatus of the invention further comprises photoreceptive control means for controlling the photoreceptor devices in either a totally driving mode or a partially driving mode, in the totally driving mode all the photoreceptor devices are driven, in the partially driving mode only a part of the photoreceptor devices in a certain area elements are driven.

According to the invention, it is possible to drive all the photoreceptor devices in the totally driving mode, and it is possible to drive only the part of the photoreceptor devices in a certain area in the partially driving mode. In some cases, for example, in the case of reading a fingerprint, it is not necessary to drive the photoreceptor devices in all the areas of the panel. In such a case, the photoreceptor devices are driven in the partially driving mode, whereby photoreceptor devices unrelated to image reading are not driven, and power consumption can be reduced.

Still further, the image reading apparatus of the invention further comprises liquid crystal controlling means for carrying out control of light transmittance of a portion of the liquid crystal layer to display an area of photoreceptive pixels containing photoreceptor devices driven in the partially driving mode.

According to the invention, since an area of photoreceptor devices driven in the partially driving mode is displayed, and thereby an area on which an object to be read such as a finger of the operator is put can be definitely displayed. Not only the operation is simplified, but also performance of image reading is ensured.

Still further, in the invention it is preferable that the panel is provided with a filter for transmitting, for each photoreceptive pixel, light of one wavelength band of a plurality of different wavelength bands, the apparatus further comprises liquid crystal controlling means for controlling transmittance of the liquid crystal layer, and photoreceptive control means for controlling driving of the photoreceptor devices, an image of each wavelength band is read by sequentially driving a portion of the liquid crystal display layer and a photoreceptor device which are contained in a photoreceptive pixel associated with each wavelength band.

According to the invention, the panel is provided with filters, each of which one of the visible light beams of red, green and blue colors passes through, for example. At first, as for a photoreceptive pixel provided with a filter for transmitting a light beam of red color, liquid crystal control of driving the liquid crystal layer and photoreceptive control of driving the photoreceptor device are carried out, whereby an image of red color is read. Next, in the same manner, an image of green color is read, and then an image of blue color is read.

Thus, portions of the liquid crystal layer and photoreceptor devices contained in photoreceptive pixels associated with the respective wavelength bands are sequentially driven, whereby without driving unrelated portions of the liquid crystal layer and photoreceptor devices, images of the respective wavelength bands can be read with a relatively small power. Moreover, since read images of the respective wavelength bands are sometimes different in resolution, the reliability of data verification can be increased by conducting data verification using all the images. In specific, this is effective for fingerprint identification or the like.

Still further, the image reading apparatus of the invention further comprises calculating means for dividing a photoreceptive level during on-conditions of the light source, by a photoreceptive level during off-conditions of the light source.

According to the invention, a photoreceptive level during on-conditions of the light source and a photoreceptive level during off-conditions of the light source are outputted, and the former is divided by the latter. Since the former is a photoreceptive level including noise and the latter is a photoreceptive level representing noise caused by ambient light unrelated to the light source, the noise can be removed in the calculation as shown above, and the accuracy in image reading can be increased still more.

Still further, in the invention it is preferable that the light source emits light of a predetermined wavelength band, and the photoreceptor devices receive light of the same wavelength band as the light from the light source.

According to the invention, by associating the photoreceptive sensitivity of the photoreceptor devices with the wavelength band of the light from the light source, for example, by using photoreceptor devices which show an excellent photoreceptive sensitivity in the wavelength band of the light from the light source, light other than the light from the light source is hard to be received, and the accuracy in image reading can be increased still more.

Still further, in the invention it is preferable that on a surface of the panel, a touch sensor or a temperature sensor is placed.

According to the invention, a touch sensor or a temperature sensor is placed on the surface of the panel, whereby the operator can conduct various kinds of input operations by operating the panel, and an operability can be enhanced. In a case where a touch sensor is used, the operator can input by pushing the surface of the panel with an input pen or a finger of the operator. In a case where a temperature sensor is used, the operator can input by moving the operator's finger or the like close to the surface of the panel, in which case it is not necessary to touch the panel with the finger. Moreover, these input operations can be associated with various kinds of controls, and the light source can be controlled by an input operation with a finger of the operator, for example.

Still further, the image reading apparatus of the invention further comprises light source controlling means for driving the light source when it is detected that the photoreceptor devices stop receiving light.

According to the invention, the light source is driven when the photoreceptor devices detect blockage of ambient light, so that it is not necessary to give directions to start driving the light source and start reading an image, an image can be read by automatic driving of the light source, and an operability can be enhanced.

BRIEF DESCRIPTION OF THE DRAWINGS

Other and further objects, features, and advantages of the invention will be more explicit from the following detailed description taken.with reference to the drawings wherein.

DETAILED DESCRIPTION OF THE PREFERRED EMBODIMENTS

Figure 1:
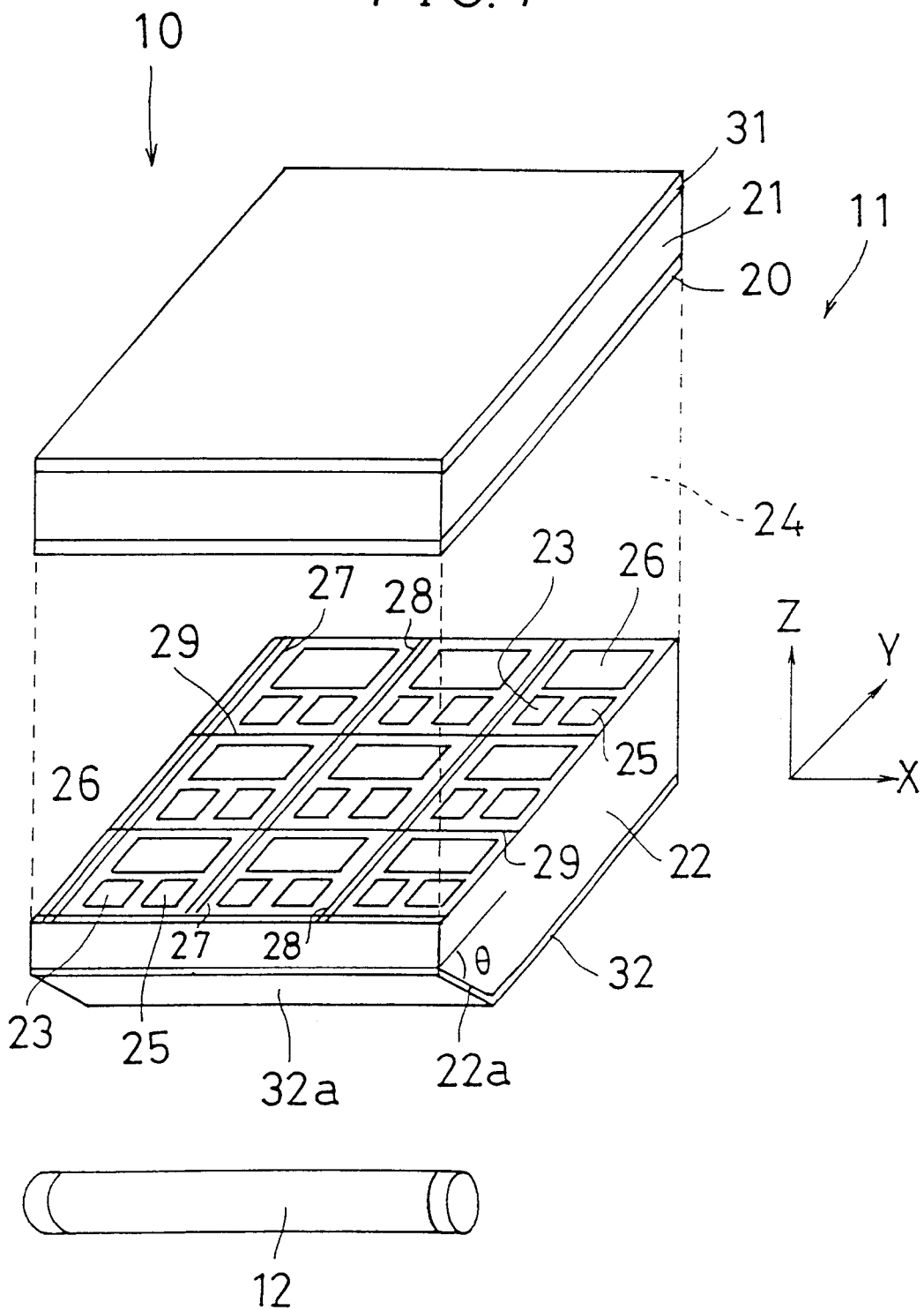
FIG. 1 is a perspective view showing a mechanical configuration of an image reading apparatus 10 which is an embodiment of the invention.

Now referring to the drawings, preferred embodiments of the invention are described below.

Figure 2:
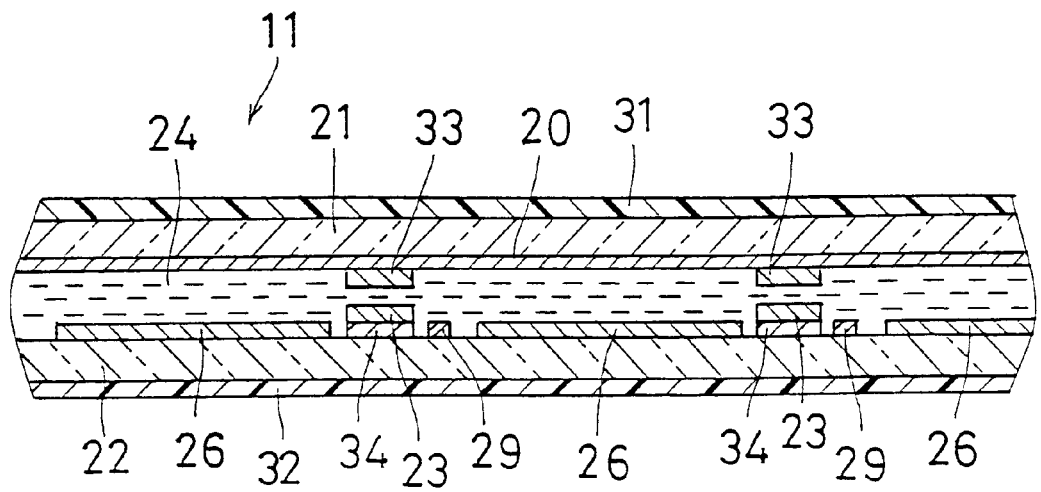
FIG. 2 is a sectional view showing a panel 11 of the image reading apparatus 10 shown by FIG. 1.

FIG. 1 is a perspective view showing a mechanical configuration of an image reading apparatus 10 which is an embodiment of the invention, and FIG. 2 is a sectional view showing a panel 11 of the image reading apparatus shown by FIG. 1. The image reading apparatus 10 comprises the panel 11 and a light source 12. The panel 11, which is an active matrix type of liquid crystal panel, includes a pair of light-transmitting substrates 21, 22, photoreceptor devices 23, a liquid crystal layer 24, and so on.

The liquid crystal layer 24 is interposed between the light-transmitting substrates 21, 22. A light-transmitting common electrode 20 is placed on a surface of the light-transmitting substrate 21 on the side of the liquid crystal layer 24, and a polarizing plate 31 is placed on a surface of the light-transmitting substrate 21 on the opposite side to the liquid crystal layer 24. A plurality of photoreceptor devices 23, switching elements 25, light-transmitting pixel electrodes 26 and wires 27–29 are placed on a surface of the light-transmitting substrate 22 on the side of the liquid crystal layer 24, and a polarizing plate 32 is placed on a surface of the light-transmitting substrate 22 on the opposite side to the liquid crystal layer 24.

As for the thickness of each component, the thickness of the polarizing plates 31, 32 is 0.3 mm, the thickness of the liquid crystal layer 24 is 5 µm, and the thickness of the light-transmitting substrates 21, 22 is 0.7 mm, for example.

Assume that two directions which are parallel to the surfaces of the light-transmitting substrate 22 and orthogonal to each other are a direction X and a direction Y, and a direction which is perpendicular to the surfaces of the light-transmitting substrate 22 is a direction Z. The wires 27, which extend in the direction Y, are mutually spaced in the direction X. The wires 28, which also extend in the direction Y, are arranged so as to be adjacent to the wires 27. The wires 29, which extend in the direction X, are mutually spaced in the direction Y. Surrounded by the wires 27–29, a plurality of rectangular regions are formed. In each rectangular region, one photoreceptor device 23, one switching element 25, and one pixel electrode 26 are placed.

The photoreceptor device 23, which is a photodiode or the like, is connected to the wire 27. The switching element 25, which is a TFT (thin-film transistor) or the like, is connected to the wires 28, 29 and the pixel electrode 26. The wire 28 is a gate line of the switching element 25, and the wire 29 is a source line of the switching element 25. During a time period when a predetermined voltage is sequentially applied to the respective wires 29, a scan is performed in a manner that a predetermined control voltage is sequentially and selectively applied to the wires 28. Thus, a portion of the liquid crystal layer 24 interposed between a desired pixel electrode 26 and the common electrode 20 is activated, and transmittance is controlled in each pixel. For the voltage applied to the wires 29, a voltage equal to or more than a threshold value activating the liquid crystal layer 24 is selected.

As shown in FIG. 2, the photoreceptor device 23 is formed on a mask 34 which is formed on the light-transmitting substrate 22, and the mask 34 prevents the photoreceptor device 23 from receiving light from a rear side. In this case, the rear side is a side of the polarizing plate 32 in the direction Z, and on the contrary, a side of the polarizing plate 31 in the direction Z is assumed to be a front side. Moreover, a mask 33 is formed on the common electrode 20 that is formed on the light-transmitting substrate 21. The mask 33, the area of which is almost equal to the area of the photoreceptor device 23, is positioned so as to be spaced from and opposed to the photoreceptor device 23 when the light-transmitting substrates 21, 22 are opposed to each other. By placing the mask 33, of all the light beams coming from the front side, it is possible to block a light beam travelling in an almost perpendicular direction to a photoreceptive surface of the photoreceptor device 23 and cause the photoreceptor device 23 to receive a light beam travelling in a slanting direction to the photoreceptive surface.

At an edge of the light-transmitting substrate 22 in the direction Y on the opposite side to the liquid crystal layer 24, a slope 22a parallel to the direction X is formed. The polarizing plate 32 covers the slope 22a, and has a slope 32a parallel to the slope 22a. The light source 12 is shaped into a bar extending in the direction X, and opposed to the slope 22a. The light source 12 is a cold cathode tube, for example. Assume that an angle formed by the slope 22a with the surface of the panel 11 is an angle θ. The angle θ is equal to or less than 90°, which is 42°, for example.

Assume that the wavelength band of light emitted by the light source 12 is the one distinguishable from ambient light, the same as that of ultraviolet rays, infrared rays or the like, and the photoreceptive sensitivity of the photoreceptor device 23 is preferable in the wavelength band of the light emitted by the light source 12. With this, a noise can be reduced, and the accuracy in image reading can be increased still more. In a case where light other than visible light is used for the light source 12, it is necessary to prepare another light source for display, such as a back light which emits light including visible light.

Further, the panel 11 may be equipped with a color filter. The color filter allows, for example, one of visible light beams to pass through each pixel. In a case where the panel is equipped with the color filter, it is necessary to make the light source 12 emit white light, and select photoreceptor devices 23 having a photoreceptive sensitivity which is preferable in the wavelength band of a visible light beam.

Furthermore, on the front side surface of the polarizing plate 31, a touch sensor or a temperature sensor may be placed. A touch sensor is composed by positioning two plates of light-transmitting electrodes so as to be spaced by a spacer, for example. When the operator touches the touch sensor with his/her finger, the touch sensor can detect the finger. A temperature sensor, which is a thermistor or the like, is capable of detecting the operator's finger by detecting the temperature of the finger even when the operator does not touch the sensor with his/her finger.

Figure 3:
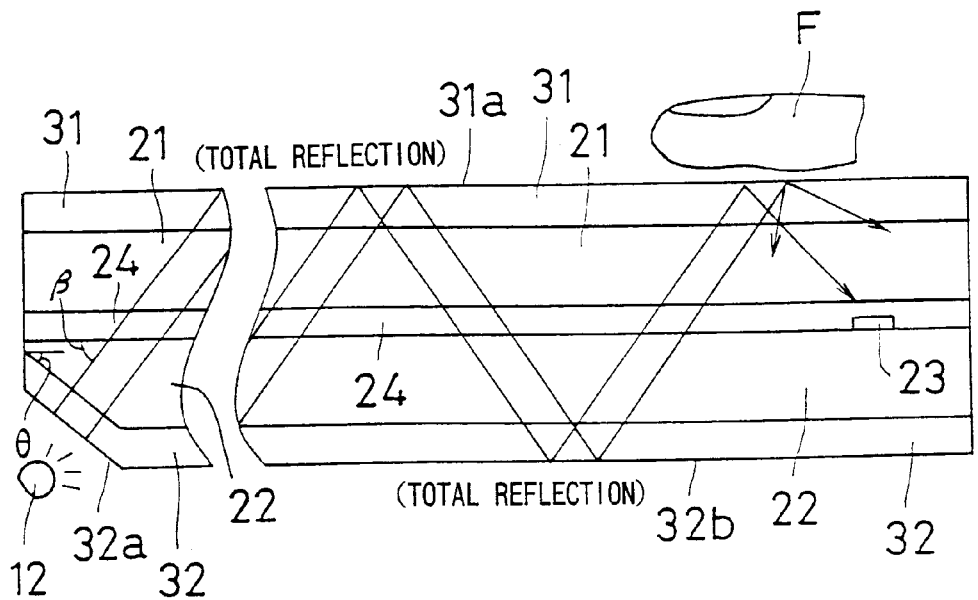
FIG. 3 is a view showing transmission of light by the image reading apparatus 10.

FIG. 3 is a view showing transmission of light by the image reading apparatus 10. Light emitted by the light source 12 reaches the slope 32a at first. Among the light beams reaching the slope 32a, light beams which reach the slope 32a at an incident angle equal to or more than a critical angle α are totally reflected, whereas some of light beams which reach the slope 32a at an incident angle less than the critical angle α enter in the light-transmitting substrate 22 via the polarizing plate 32. As a result, a direction in which light travels in the panel 11 can be restricted. In other words, an angle A formed by the restricted direction of light with the surface of the light-transmitting substrate 22 satisfies an inequality as shown below:

$$\pi/2-\alpha-\theta < A < \pi/2+\alpha-\theta$$

Among the light beams entering in the light-transmitting substrate 22, a light beam which travels in a perpendicular direction to the slope 32a shows the highest transmittance, so that the light beam also shows the highest light intensity. A direction in which the light beam showing the highest intensity travels is parallel to a plane YZ, and the direction forms an angle β (=π/2−θ) with the surface of the light-transmitting substrate 22. In a case where the angle θ is 42°, the angle β is 48°.

The light beams having entered in the light-transmitting substrate 22 pass through the liquid crystal layer 24, the light-transmitting substrate 21 and the polarizing plate 31 in this order, and reach an interface 31a between the polarizing plate 31 and the outside. The interface 31a is a surface of the panel 11. Among the light beams reaching the interface 31a, light beams which reach the interface 31a at an incident angle equal to or more than a critical angle γ are totally reflected, whereas some of light beams which reach the interface 31a at an incident angle less than the critical angle γ go outside through the polarizing plate 31. As a result, a direction in which light travels in the panel 11 can be restricted still more. In other words, an angle B formed by the restricted direction of light with the surface of the light-transmitting substrate 22 satisfies an inequality as shown below:

$$B \leq \pi/2-\gamma$$

By selecting the critical angle γ so as to satisfy γ<θ−α, it is possible to make all the light beams having entered through the slope 22a, totally reflected. Moreover, by selecting the critical angle γ so as to satisfy γ≦π/2−β, it is possible to make the light beam showing the highest intensity emitted from the light source 12, totally reflected.

The light beams having been reflected on the interface 31a reach an interface 32b between the polarizing plate 32 and the outside, and thereafter the light beams are repeatedly reflected on the interfaces 31a, 32b. The interface 32b is also a surface of the panel 11. As a result, from among the light beams which pass in the panel 11, light beams which reach at an incident angle equal to or more than the critical angle γ are screened out.

The light beams which have been transmitted in the panel 11 reach an object touching the surface of the panel 11, for example, the operator's finger F touching the interface 31a as shown in FIG. 3. The photoreceptor device 23 receives light returned from the object, whereby an image of the object can be read.

Figure 4:
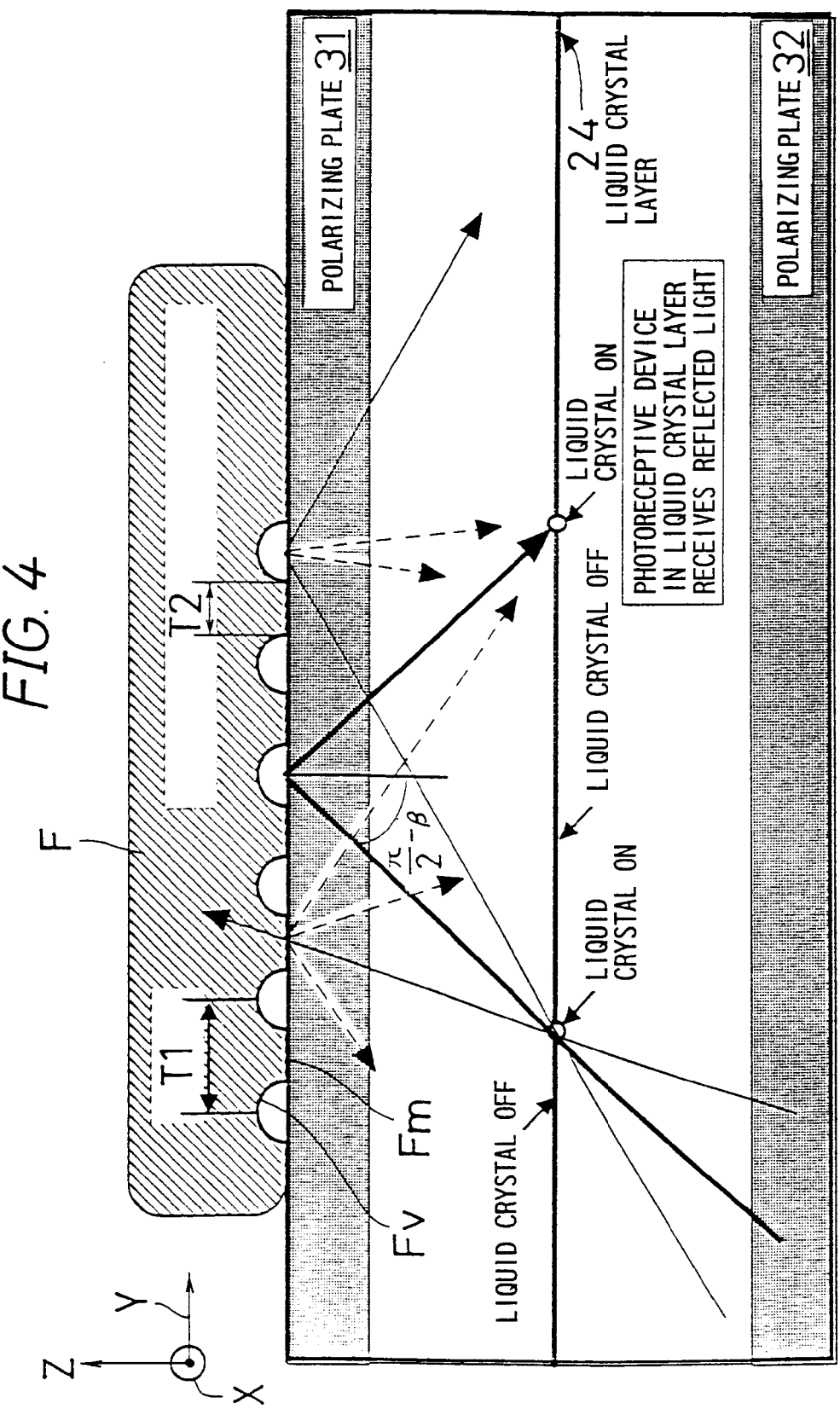
FIG. 4 is a view showing a fingerprint reading operation by the image reading apparatus 10.
Figure 5:
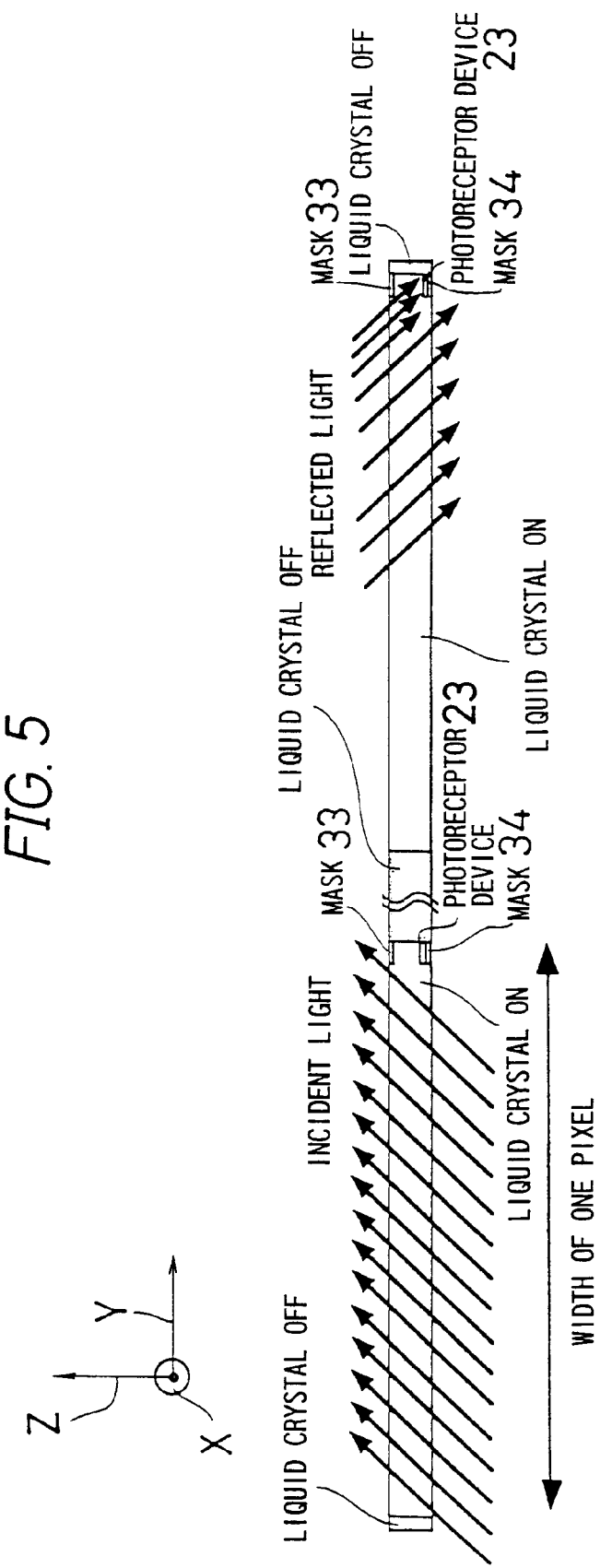
FIG. 5 is a view showing a fingerprint reading operation by the image reading apparatus 10.

FIGS. 4, 5 are views showing a fingerprint reading operation by the image reading apparatus 10. A mound Fm and valley Fv of a finger F form a fingerprint, and on the panel 11, the mound Fm comes in contact with the polarizing plate 31, whereas the valley Fv does not come in contact with the polarizing plate 31. Among light beams which reach the finger F on the panel 11, a light beam which reaches the valley Fv is reflected in the same manner as when an object is not present on the panel 11. A light beam which reaches the mound Fm is diffused under influence of an object which comes in contact with the plate. Thus, the light beams reaching the valley Fv and mound Fm of the fingerprint move in different manners, so that it is possible to read a fingerprint by receiving light beams from the finger by the photoreceptor devices 23. A pitch width T1 between the valleys Fv, Fv is approximately 400 μm, and a width T2 between the mounds Fm, Fm which come in contact with the plate is approximately 200 μm.

The accuracy in fingerprint reading depends on the intensity, directivity and so on of light travelling in the panel 11. As explained with reference to FIG. 3, a direction in which light travels is restricted, so that the directivity of the light travelling in the panel 11 is relatively high. Therefore, the accuracy in image reading by the image reading apparatus 10 is excellent. In addition, by the masks 33, 34 described with reference to FIG. 2, ambient light can be blocked, the directivity of light leading to the photoreceptor devices 23 can be enhanced still more, and the accuracy in image reading can be increased.

A part of the liquid crystal layer 24 positioned on an optical path from the slope 32a of the polarizing plate 32 to the photoreceptor device 23 is controlled so as to transmit light. As seen from FIGS. 4, 5, as for a pixel which is controlled so as to pass through the liquid crystal layer 24, the associated liquid crystal is in on-conditions, and as for a pixel which is controlled so as not to pass through the liquid crystal layer 24, the associated liquid crystal is in off-conditions.

The thickness of the panel 11, which is a sum of thicknesses of the light-transmitting substrates 21, 22 and the polarizing plates 31, 32, is approximately 2 mm. At a depth of approximately 1 mm from the surfaces of the panel 11, the liquid crystal layer 24 is placed. Light which travels forming an angle of 48° with the surface of the panel 11 travels in the direction Y by 2×1 mm×tan 42=1.8 mm during a time period between passing through the liquid crystal layer 24 and reaching the liquid crystal layer 24 next time. For example, the length of a pixel in the direction Y is 63.5 μm in a 400 dpi type of liquid crystal display panel. Therefore, the light is allowed to pass through a pixel spaced from the pixel in which the light has been transmitted through the liquid crystal layer 24, by about 28 pixels in the direction Y, whereby it is possible to cause the photoreceptor device 23 to receive only light from a direction in which light shows particularly strong intensity.

Thus, light travelling in a direction restricted to the photoreceptor device 23 passes through the restricted optical path and reaches the photoreceptor device 23. The light is transmitted through a portion of the liquid crystal layer 24 which is positioned on the optical path leading to the photoreceptor device 23, so that light passing through another path would not be received, the occurrence of a noise can be prevented, and the accuracy in image reading can be increased still more.

Figure 6:
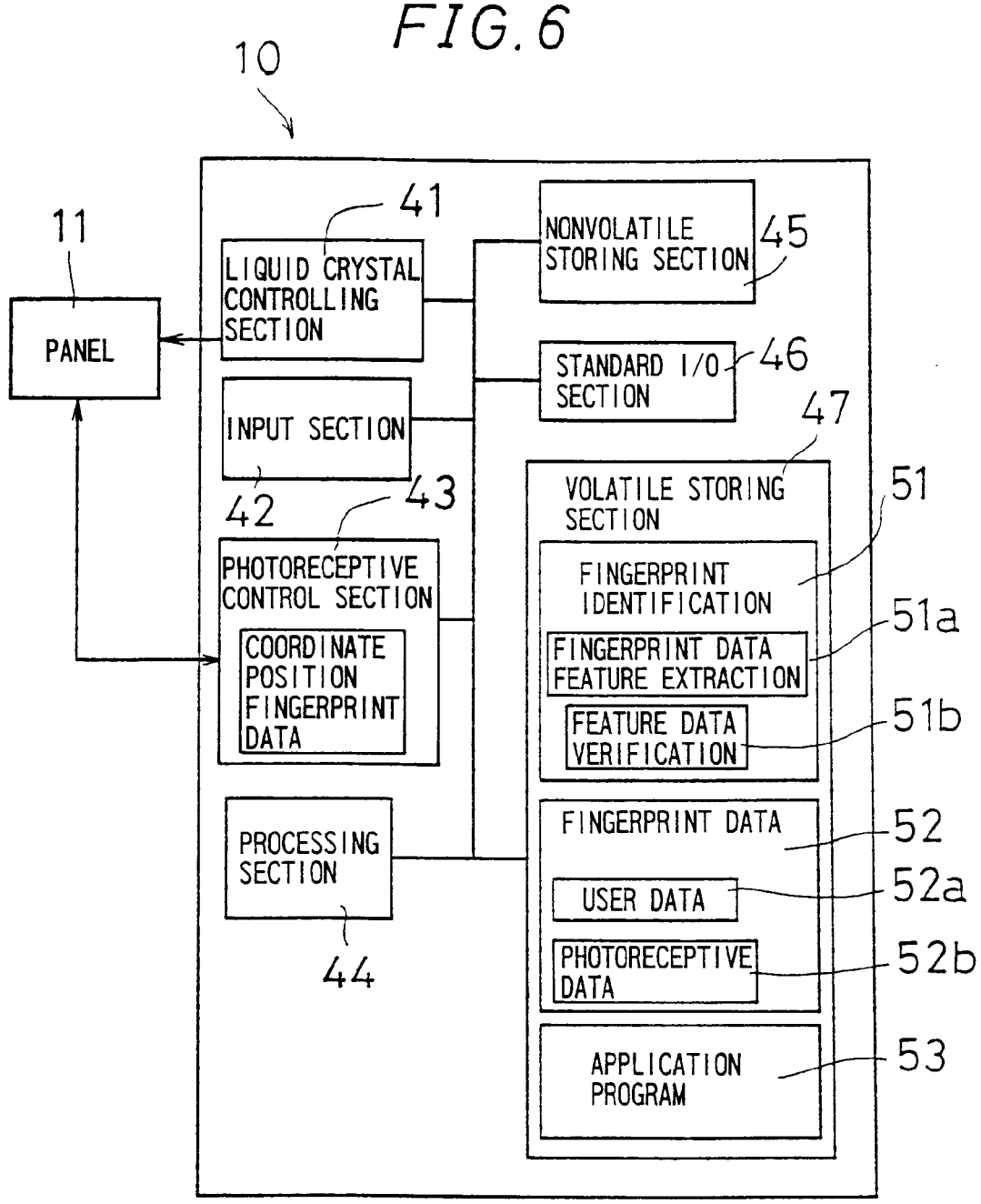
FIG. 6 is a block diagram showing an electrical configuration of the image reading apparatus 10.

FIG. 6 is a block diagram showing an electrical configuration of the image reading apparatus 10. The image reading apparatus 10 comprises a liquid crystal controlling section 41, an input section 42, a photoreceptive control device control section 43, a processing section 44, a nonvolatile storing section 45, a standard I/O (input/output) section 46, and a volatile storing section 47. The liquid crystal control section 41 controls the respective switching elements 25 of the panel 11, and controls transmittance of the liquid crystal layer 24 for each pixel electrode 26. The input section 42 is an input device such as a keyboard or a mouse for inputting various kinds of data by an operation of the operator. The photoreceptive control section 43 executes control for reading out electrical charge accumulated by the photoreceptor device 23.

The nonvolatile storing section 45 stores fingerprint data of the user in advance. The volatile storing section 47 has a plurality of work areas, wherein an application program for fingerprint identification or the like is loaded into an application program area 53. In a fingerprint data area 52, a user data area 52*a* stores data of the user whose fingerprint data is stored in the nonvolatile storing section 45, and a photoreceptive data area 52*b* stores fingerprint data from the photoreceptive control section 43. In a fingerprint identification area 51, a fingerprint data feature extracting area 51*a* stores feature data extracted from photoreceptive data, and a feature data verifying area 52*b* stores two data for verification.

The processing section 44, which is composed of a CPU (central processing unit) and so on, performs various kinds of processes such as carrying out an application program, extracting feature data from photoreceptive data, or verifying feature data.

In specific, the processing section 44 performs a process of extracting photoreceptive data of a specific photoreceptor device 23 from among photoreceptive data of all the photoreceptor devices 23. The specific photoreceptor device 23 is the one positioned on an extension line of a path of light entering through the slope 22*a* and passing through a part of the liquid crystal layer 24. For example, the specific photoreceptor device 23 is the one spaced by 28 pixels in the direction Y from a pixel containing a part of the liquid crystal layer through which the light has been transmitted.

Although light transmitted through the liquid crystal layer 24 travels through a restricted optical path and reaches the photoreceptor device 23, photoreceptive data are obtained at first from all the photoreceptor devices 23 including the specific photoreceptor device 23 positioned on the restricted optical path. Then, photoreceptive data of the specific photoreceptor device 23 is extracted from among all the photoreceptive data. Thus, photoreceptive data obtained from light having passed through another path would not be used, the occurrence of a noise can be prevented, and the accuracy in image reading can be increased still more.

Further, extraction of photoreceptive data may be conducted by dividing one frame into a display time period and a detection time period, driving the liquid crystal in a manner as mentioned before during the detection time period to accumulate photoreceptive data, and extracting photoreceptive data by a segment driver of the liquid crystal. In this case, all the data of the photoreceptor devices are discharged at the beginning of the detection time period. A common driver of the liquid crystal selects lines one by one in the same manner as in a display cycle, the segment driver samples and holds an analog value in each cycle, and a comparator judges whether reception of light is valid or not (grabbing in binary). It is also possible to use a plurality of comparators and perform grabbing in multiple values. The value obtained by the comparator is read out by a control section, and sent to the CPU as data of each row in each line. By turning the back light off when data is read out, unnecessary reception of light is avoided.

The photoreceptive control section 43 drives the photoreceptor devices 23 either in a totally driving mode of driving all the photoreceptor devices 23 or in a partially driving mode of driving only a photoreceptor device 23 in a predetermined certain area. In the totally driving mode, a relatively large object such as a document which has almost the same size as the panel 11 can be read, and in the partially driving mode, a relatively small object such as a fingerprint can be read. In the partially driving mode, a photoreceptor device 23 unrelated to image reading would not be driven, so that power consumption can be reduced.

Further, the photoreceptive control section 43 executes photoreceptive control both when the light source 12 is driven and when the light source 12 is not driven. The processing section 44 divides a photoreceptive level when the light source 12 is driven by a photoreceptive level when the light source 12 is not driven. Thus, a noise caused by ambient light unrelated to the light source 12 can be eliminated, so that the accuracy in image reading can be increased still more.

Figure 7:
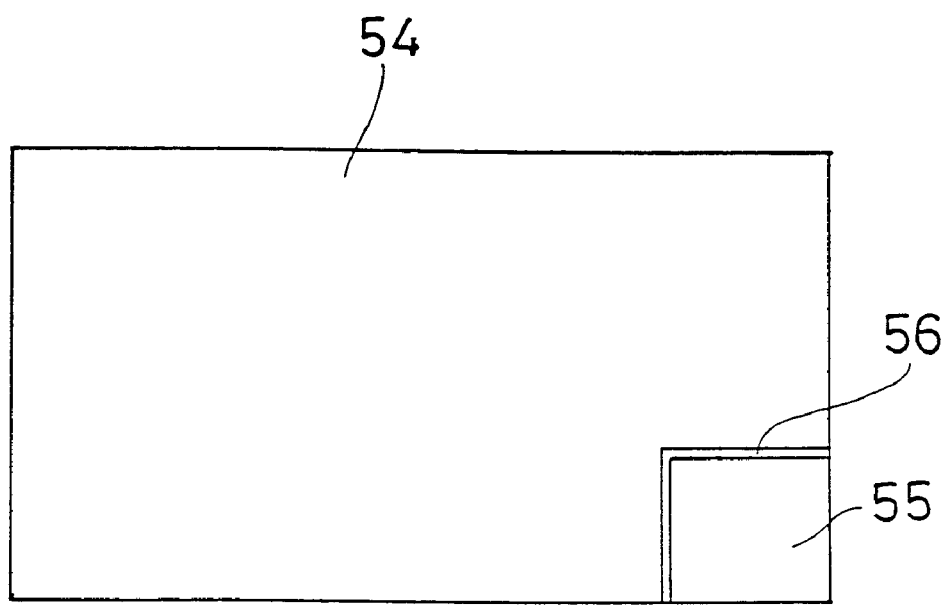
FIG. 7 is a view showing a total display area 54 and a partial display area 55.

The liquid crystal control section 41 executes control of displaying an area of a driven photoreceptor device 23 when the photoreceptive control section 43 works in the partially driving mode. This area may be displayed in any form, if the operator can recognize the area, and, for example, the control section controls so that light is transmitted through a part of the liquid crystal layer 24, which part is associated with a pixel positioned on an outline 56 of a partially display area 55 positioned at the bottom right-hand corner in a total display area 54 of the panel 11, as shown in FIG. 7. Thus, the partially display area 55 with a finger put on is displayed, so that the operation is simple, and moreover, image reading can be performed in a reliable manner.

Further, the image reading apparatus 10 shown by FIG. 6 may further comprise light source control means for driving the light source 12 when the photoreceptor devices 23 detect that ambient light is blocked. When the operator puts his/her finger on the panel 11, ambient light from the front side is blocked and the photoreceptor devices 23 are prevented from receiving the light. That is to say, the photoreceptor devices 23 detect that ambient light is blocked. The light source control means drives the light source 12 when blockage of ambient light is detected by the photoreceptor devices 23. With this, it is not necessary to give directions to start driving the light source 12 and start reading an image, and an image can be read by automatic driving of the light source 12, so that the operability can be enhanced.

In the following, control in the case of providing the panel 11 with a color filter will be illustrated. The color filter is constituted so that one of the visible light beams of three colors of R (red), G (green) and B (blue) is allowed to pass therethrough for each pixel. At first, a pixel which is provided with a filter which allows a visible light beam of red color to pass is controlled by the liquid crystal control section 41 so that light is transmitted through the liquid crystal layer 24. At this moment, control of driving a photoreceptor device 23 included in the same red-color pixel is executed by the photoreceptive control section 43, whereby an image of red color is read. Then, in the same manner, an image of green color is read by controlling a green-color pixel, and furthermore, an image of blue color is read.

Thus, portions of the liquid crystal layer 24 and photoreceptor devices 23 included in pixels associated with the respective colors of RGB are sequentially driven, whereby images of the respective colors can be read using relatively small power without driving unrelated portions of the liquid crystal layer 24 and photoreceptor devices 23. Moreover, by using read images of the respective colors to verify fingerprint data, the reliability in verification of fingerprint data can be increased. Colors of light transmitted through the color filter are not limited to RGB.

Figure 8:
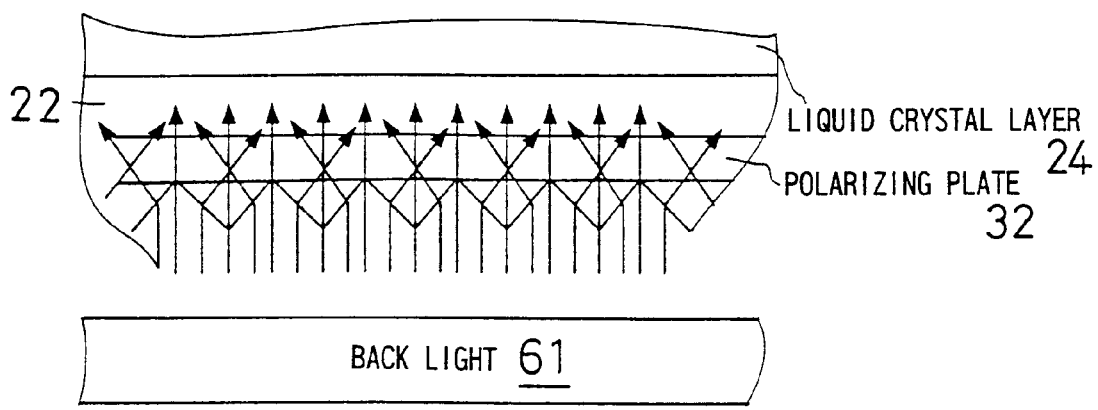
FIG. 8 is a view showing an image reading apparatus which is another embodiment of the invention.
Figures 9A, 9B:
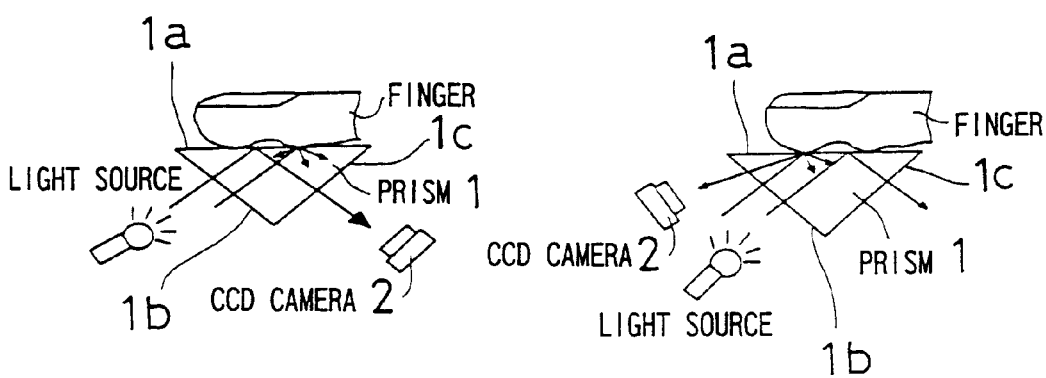
FIGS. 9A, 9B are views showing a conventional fingerprint reading apparatus using a prism.

FIG. 8 is a view showing an image reading apparatus which is another embodiment of the invention. The image reading apparatus of the embodiment is the one that a plurality of chips as described in Japanese Examined Patent Publication JP-B2 2568310 are formed on the polarizing plate 32 used in the embodiment shown by FIGS. 1–7 and a flat back light 61 is placed instead of the light source 12. In the embodiment, the polarizing plate 32 has a function of condensing light, so that the accuracy in image reading can be increased. Moreover, since it is not necessary to additionally prepare a condensing lens, a downsized apparatus can be produced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image reading apparatus comprising:
   a panel including a pair of light transmitting substrates and a plurality of photoreceptor devices which are two-dimensionally arranged and interposed between the pair of substrates, an edge of one of the pair of light-transmitting substrates being provided with a slope; and
   a light source opposed to the slope of the light-transmitting substrate,
   wherein an object in contact with a surface of the panel is irradiated with light transmitted within the panel, and the light returned from the object is received by the photoreceptor devices, whereby an image of the object is read.

2. The image reading apparatus of claim 1, wherein the panel is provided with a mask for blocking light which enters via a surface of the light-transmitting substrate and reaches a photoreceptor device.

3. The image reading apparatus of claim 1, further comprising:
   calculating means for dividing a photoreceptive level during on-conditions of the light source, by a photoreceptive level during off-conditions of the light source.

4. The image reading apparatus of claim 1, wherein the light source emits light of a predetermined wavelength band, and the photoreceptor devices receive light of the same wavelength band as the light from the light source.

5. The image reading apparatus of claim 1, wherein on a surface of the panel, a touch sensor or a temperature sensor is placed.

6. The image reading apparatus of claim 1, further comprising:
   light source controlling means for driving the light source when it is detected that the photoreceptor devices stop receiving light.

7. An image reading apparatus comprising:
   a panel including a pair of light transmitting substrates, a plurality of photoreceptor devices which are two-dimensionally arranged and a liquid crystal layer having a variable transmittance, the plurality of photoreceptor devices and the liquid crystal layer constituting photoreceptive pixels and being interposed between the pair of substrates, an edge of one of the pair of light-transmitting substrates being provided with a slope; and
   a light source for launching light into the panel,
   wherein an object in contact with a surface of the panel is irradiated with light transmitted within the panel, and the light returned from the object is received by the photoreceptor devices, whereby an image of the object is read.

8. The image reading apparatus of claim 7, further comprising:
   liquid crystal controlling means for carrying out control of transmitting light through a portion of the liquid crystal layer, the portion of the liquid crystal layer being located on an optical path extending from the slope of the light-transmitting substrate to a photoreceptor device.

9. The image reading apparatus of claim 7, further comprising:
   data extracting means for extracting photoreceptive data of a photoreceptor device located on an optical path which extends from the slope of the light-transmitting substrate and passes through a portion of the liquid crystal layer through which light has been transmitted, from among photoreceptive data of all the photoreceptor devices.

10. The image reading apparatus of claim 7, wherein the panel is provided with a mask for blocking light which enters via a surface of the light-transmitting substrate and reaches a photoreceptor device.

11. The image reading apparatus of claim 7, further comprising:
    photoreceptive control means for controlling the photoreceptor devices in either a totally driving mode or a partially driving mode, in the totally driving mode all the photoreceptor devices are driven, in the partially driving mode only a part of the photoreceptor devices in a certain area elements are driven.

12. The image reading apparatus of claim 11, further comprising:

liquid crystal controlling means for carrying out control of light transmittance of a portion of the liquid crystal layer to display an area of photoreceptive pixels containing photoreceptor devices driven in the partially driving mode.

13. The image reading apparatus of claim 7, wherein the panel is provided with a filter for transmitting, for each photoreceptive pixel, light of one wavelength band of a plurality of different wavelength bands, the apparatus further comprising:

liquid crystal controlling means for controlling transmittance of the liquid crystal layer, and photoreceptive control means for controlling driving of the photoreceptor devices, wherein an image of each wavelength band is read by sequentially driving a portion of the liquid crystal display layer and a photoreceptor device which are contained in a photoreceptive pixel associated with each wavelength band.

14. The image reading apparatus of claim 7, further comprising:

calculating means for dividing a photoreceptive level during on-conditions of the light source, by a photoreceptive level during off-conditions of the light source.

15. The image reading apparatus of claim 7, wherein the light source emits light of a predetermined wavelength band, and the photoreceptor devices receive light of the same wavelength band as the light from the light source.

16. The image reading apparatus of claim 7, wherein on a surface of the panel, a touch sensor or a temperature sensor is placed.

17. The image reading apparatus of claim 7, further comprising:

light source controlling means for driving the light source when it is detected that the photoreceptor devices stop receiving light.

* * * * *